United States Patent [19]

Foulkes, Jr.

[11] Patent Number: 5,086,939
[45] Date of Patent: Feb. 11, 1992

[54] POTS

[76] Inventor: Keith Foulkes, Jr., 5520 E. Edgerton, Brecksville, Ohio 44141

[21] Appl. No.: 628,392

[22] Filed: Dec. 17, 1990

[51] Int. Cl.⁵ ............................................. B65D 25/28
[52] U.S. Cl. ................................ 220/94 A; 220/94 R; 220/912; 220/DIG. 13; 99/403
[58] Field of Search ..................... 99/403; 126/73; 220/DIG. 13, 94 R, 912, 94 A

[56] References Cited

U.S. PATENT DOCUMENTS

| | | | |
|---|---|---|---|
| 315,989 | 4/1885 | Ziph | 220/912 |
| 781,081 | 1/1905 | MacFate | 220/912 |
| 784,950 | 3/1905 | Lindsay | 220/DIG. 13 |
| 2,125,741 | 8/1938 | Stirn | 220/912 |
| 3,007,595 | 11/1961 | Remley | 220/912 |
| 3,059,809 | 10/1962 | Thompson, III | 220/94 R |
| 3,110,303 | 11/1963 | Brownrigg | 220/912 |
| 3,342,517 | 9/1967 | Pryce | 220/94 R |
| 3,542,236 | 11/1970 | Dru | 220/94 R |
| 3,981,044 | 9/1976 | Luebke et al. | 220/94 R |
| 4,083,081 | 4/1978 | Witte | 220/94 R |

FOREIGN PATENT DOCUMENTS 21879 9/1903 United Kingdom ............... 220/912

Primary Examiner—Joseph Man-Fu Moy
Attorney, Agent, or Firm—J. Helen Slough

[57] ABSTRACT

The invention relates to pots or pans for cooking, etc. wherein the pots have rear and front sides of the same disposed at an angle less than 90 degrees and the lateral sides extend preferably perpendicularly to the bottom of the pot which is cylindrical, has a circular bottom and approaches an ellipse at the uppermost portion of the pot. The pot is provided with pair of handles permanently affixed to the lateral sides thereof and a detachable handle adapted to be hooked into secure engagement with the permanent handles for use by either right or left handed persons. A cover may be provided thereon.

3 Claims, 4 Drawing Sheets

POTS

FIELD OF THE INVENTION

This invention relates to improvements in cooking vessels and relates more particularly to improvements in cooking pots or pans.

BACKGROUND OF THE INVENTION

Throughout history pots and pans have been made in one or two selected designs. Either the pot was manufactured with side walls extending upwardly from the bottom portion and perpendicular to the bottom portion or with side walls extending upwardly and slightly outwardly from the bottom portion. A major problem with pots and pans of these types exists when one removes the cover on a boiling or cooking mixture within the pot to view the same occurs because steam rising from the boiling or cooking of food within the pot makes it virtually almost impossible to view the contents of the pan closely without steam contacting one's face or one's hands when stirring the contents. Also, pouring contents from pots or pans in which the sides are perpendicular or extend outwardly about the pan encounted similar difficulties.

An object of this invention is to create a pot or pan in which one can view the full circumference of the interior of the cooking and/or boiling contents more easily and in which one can stir the contents without any steam rising from the contents contacting the face or hands of the user. A further object of the invention is to provide a pot wherein the use, lifting and pouring of the contents is facilitated. Another object of the invention is to provide a pot which is relatively simple in manufacture and highly efficient in use.

SUMMARY OF THE INVENTION

The invention relates to an improved pot wherein an individual may view and stir the contents of the pot without being burned by steam rising from the boiling contents of the pot. In the present invention to overcome the referenced defects, a pair of opposite sides of the pot are slanted from front to rear and have a circular flat bottom, and sides perpendicular or Vertical to the bottom are provided on the sides rotated 90 degrees to the slanted front and rear sides of the pot. The pot comprises a circular bottom, and substantially approaches an elliptical shape on the upper surface of the pot. Handles of improved design are provided on the opposite vertical sides of the pot and are available for use by either right or left handed persons. Extension means for the handles are provided to assist a user in removal or placement of the pot and said means are provided for use on either of the first mentioned handles.

REFERRING TO THE DRAWINGS

DETAILED DESCRIPTION OF THE PREFERRED EMBODIMENT

Figure 1:
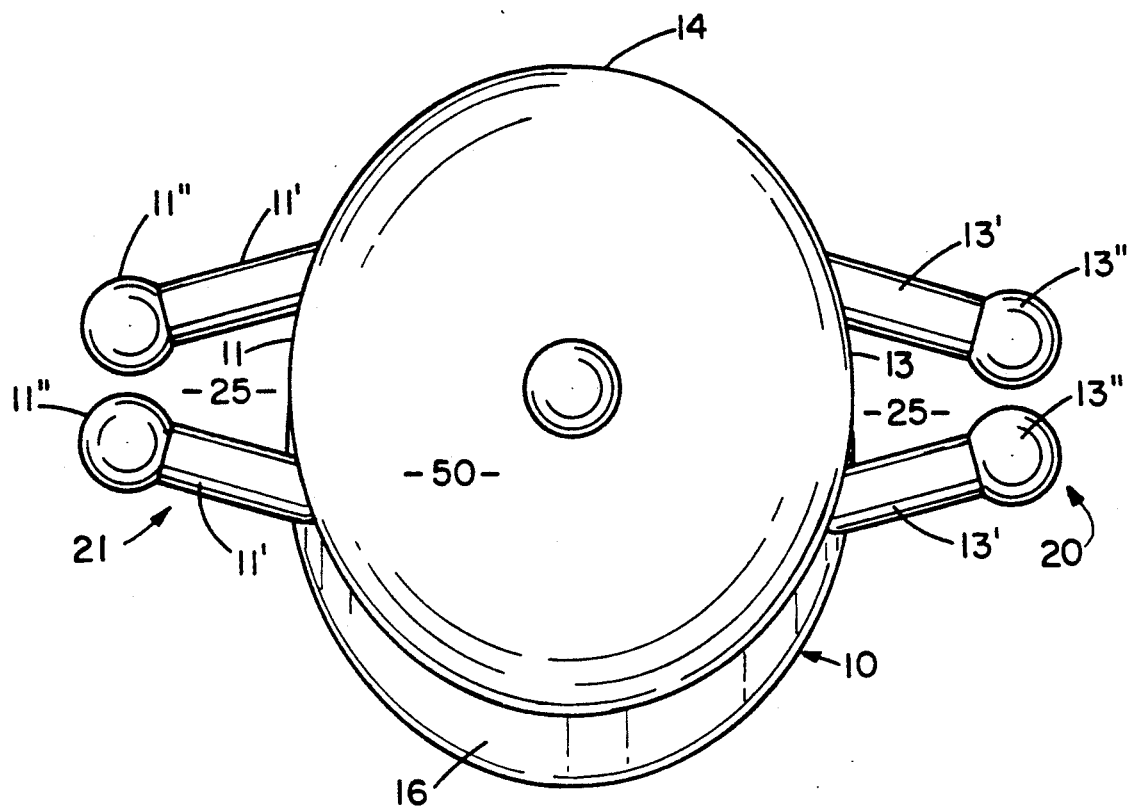
FIG. 1 is a top elevational view of a preferred embodiment of my invention.
Figure 2:
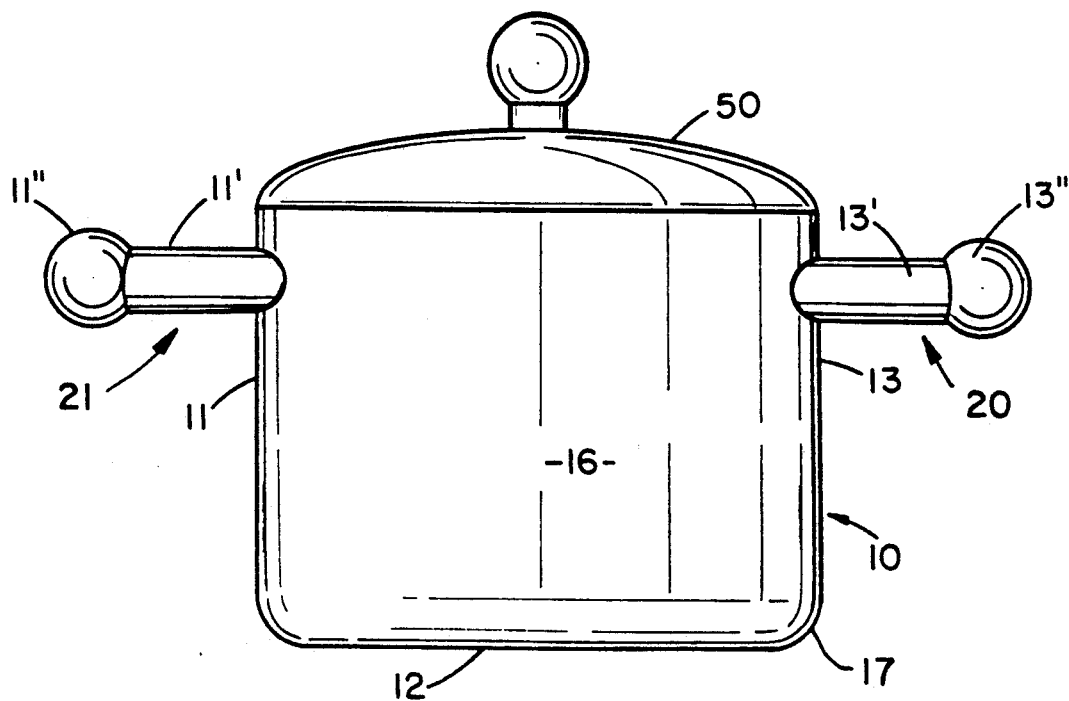
FIG. 2 is an elevational view of the rear of the vessel of FIG. 1.
Figure 3:
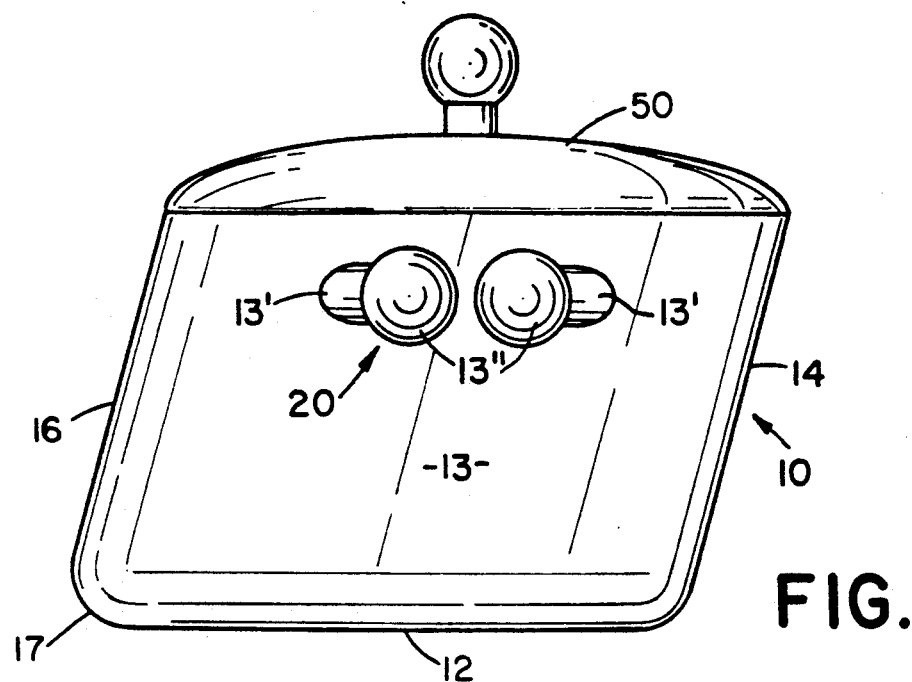
FIG. 3 is a side elevational view as viewed from disclosing the angle of the rear and front sides of the vessel of FIG. 1.
Figure 4:
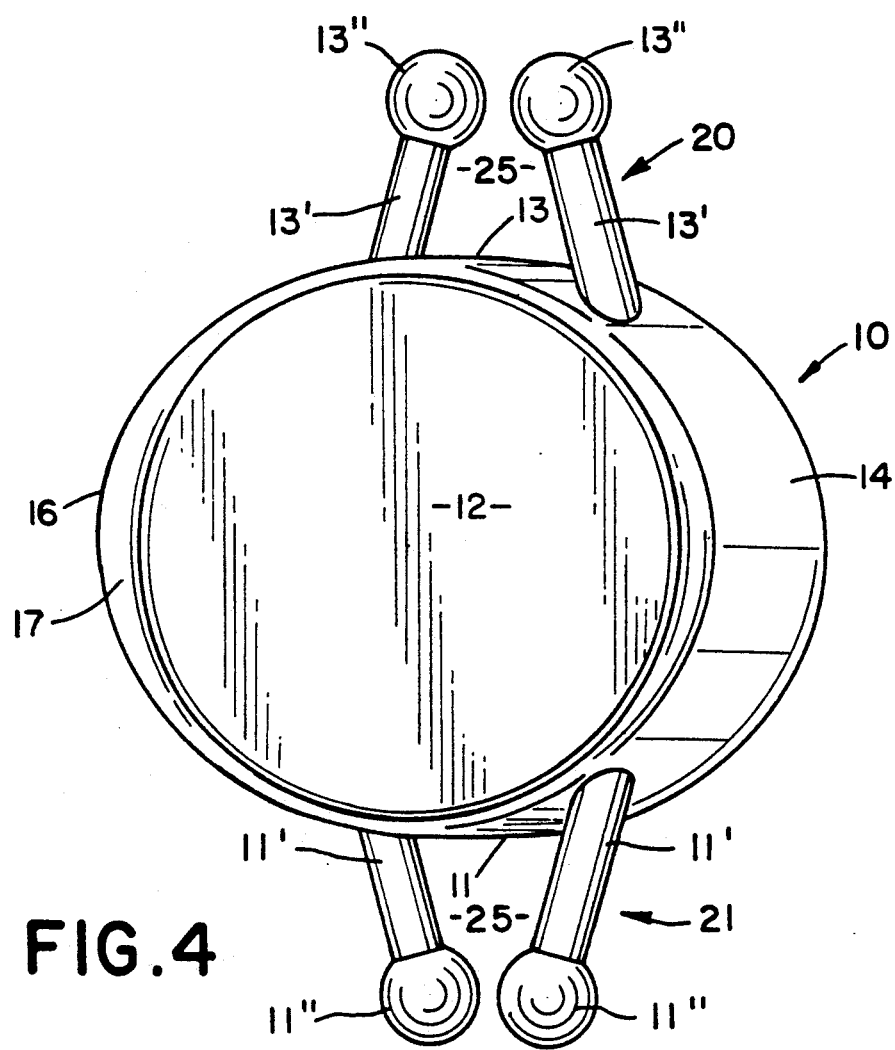
FIG. 4 is a bottom plan view of the vessel of FIG. 1.

The figures of the drawings illustrate a preferred embodiment of my invention and in said drawings like parts are designed by like reference characters. In FIG. 2, I show a side view of a preferred embodiment of a pot or pan. In this figure one can see that the bottom 12 is circular in form and the top substantially flat, the top and bottom parallel to each other and parallel to the cooking surface. The front and rear portions 14 and 16 are parallel to each other but, unlike the prior art said portions are not perpendicular to the bottom, but preferably slanted at an angle of approximately 70 degrees to bottom 12 and the sides 11 and 13 are disposed perpendicularly and vertically to the bottom of the pot. The front and rear sides are slanted in the same direction at preferred angle to prevent steam rising from the boiling contents of the pot contacting a person viewing the contents of the pot or stirring the same. The pot in the invention comprises a flat bottom surface preferably rounded at 17 adjacent the lower surface thereof to facilitate cleaning of the pan. The front and rear walls of the same extend upwardly from the bottom and are slanted in the rearward facing direction of the pot when placed on the cooking surface. The pot then, when properly placed on the heating surface, presents an appearance of sloping inwardly away from a person standing in front of the heating surface of the stove or the like. In pouring the mixture, when desired, out of the pot the pot, because it faces a receiving receptacle at an angle leaning toward the receptacle enables the contents in the pot to be deposited more quickly and without exposure of the pourer to the heat of the contents or to steam issuing therefrom and with Complete view of the contents.

The pot is provided as shown with handles 20. 21 on the opposite sides 11 and 13. Said handles are preferably disposed in pairs of handles having relatively short stems 11' an 13' provided with ball shaped ends 11" and 13" respectively. The stems preferably extend outwardly of the sides 11 and 13 and the stems of each pair are angled toward each other creating substantially V-shaped converging spaces 25 therebetween. Said handles are permanently affixed to the upper portion of the sides 11 and 13 and extend outwardly therefrom.

Figure 5:
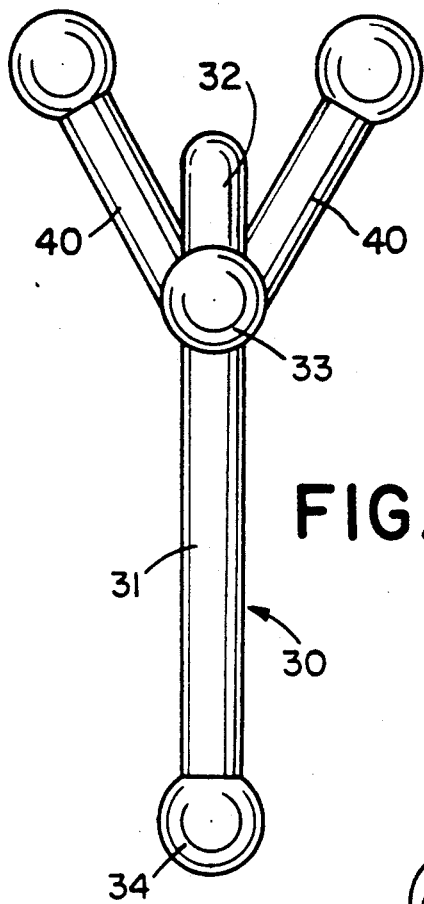
FIG. 5 is a bottom view of an extension handle adapted to be used with handles on the vessel of FIG. 1.

In the preferred embodiment on the ends of each of these rod shaped stem members are ball-shaped or truncated spherical shaped members of a diameter larger than the stems. The outer ends of the stems of each pair of handles having the truncated spherical ends preferably are at a distance from each other of less than the width of a hook shaped member of a detachable handle 30 as shown in FIG. 5. The handle 30 is provided with a relatively long curved reach member 31 having a curved or hooked end 32 at one end having preferably a spherical member 33 at the end of the curved member and provides at its opposite end with a spherical member 34. The curved end 32 is adapted to be hooked into and through the space 25 provided between the stems of the permanent handles.

Figure 6:
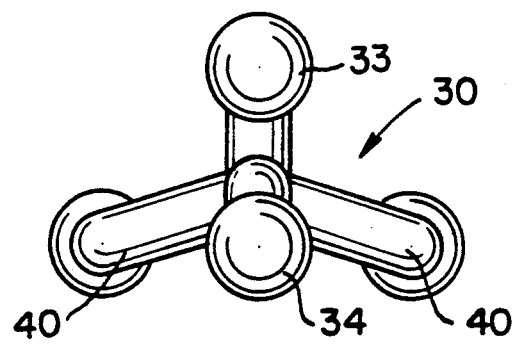
FIG. 6 is an end view of the extension handle of FIG. 5.
Figure 7:
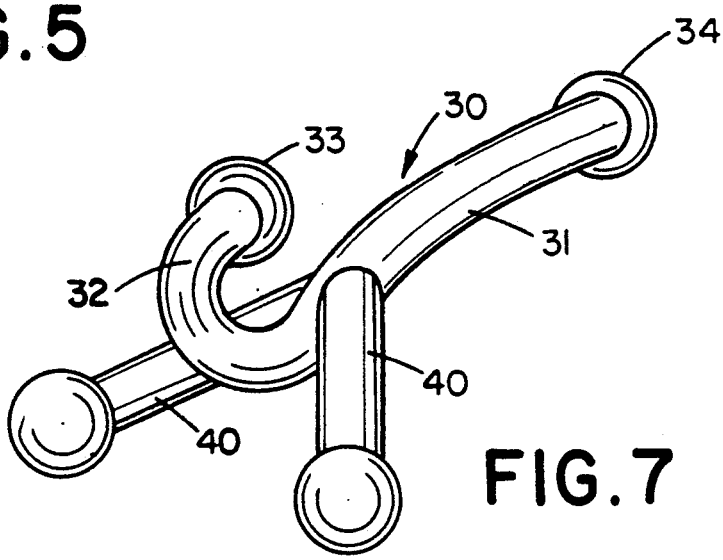
FIG. 7 is a perspective view of the extension handle of FIGS. 5 and 6.
Figure 8:
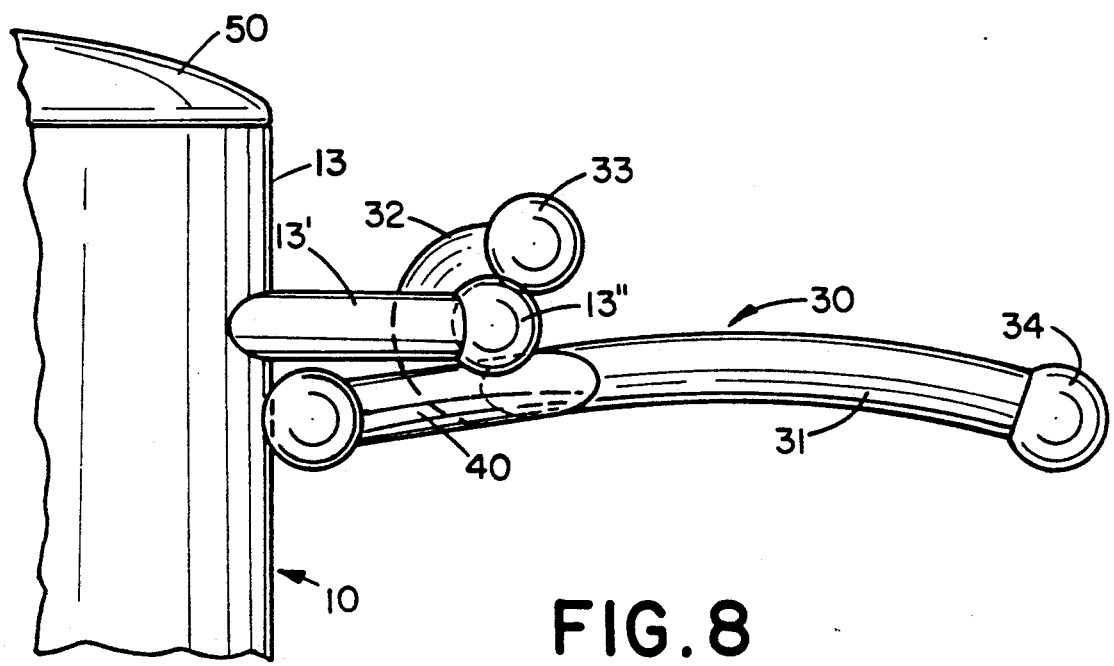
FIG. 8 is a side view of a portion of the vessel of FIG. 1 illustrating a preferred method for attaching the same to a handle of the vessel.
Figure 9:
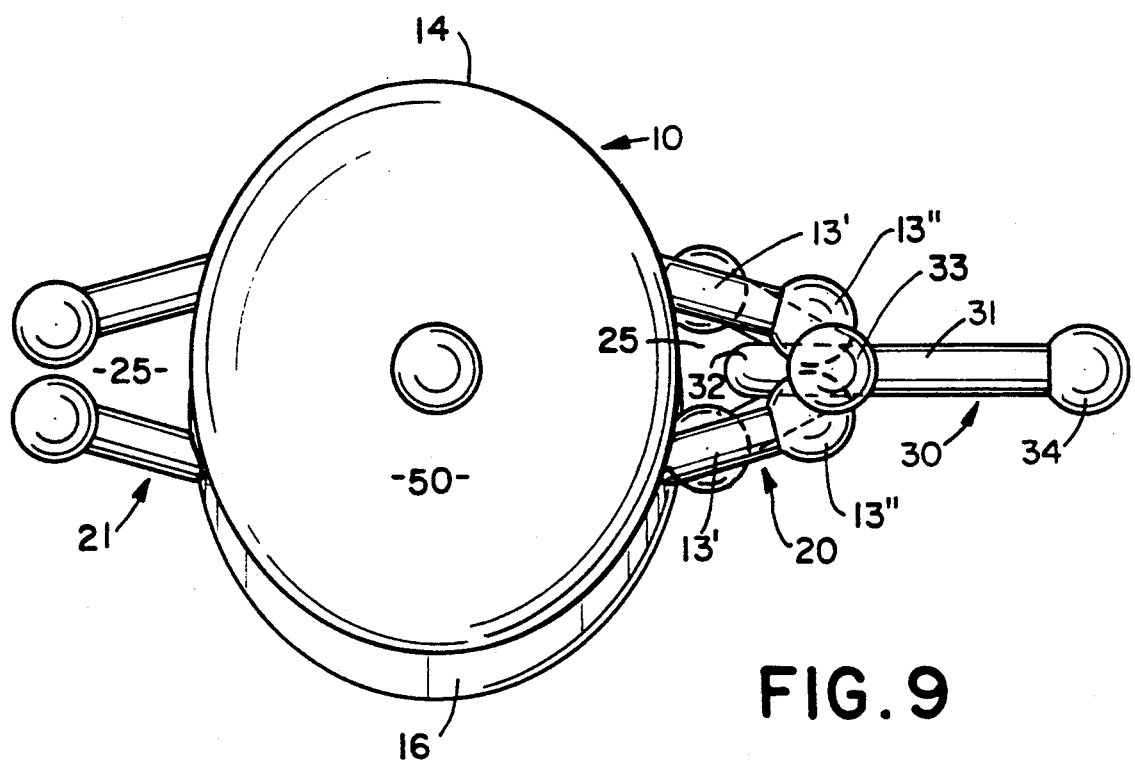
FIG. 9 is a top elevational view of the pot of FIG. 1 showing the extension handle as applied in FIG. 8 to the permanent handles of the pot.
Figure 10:
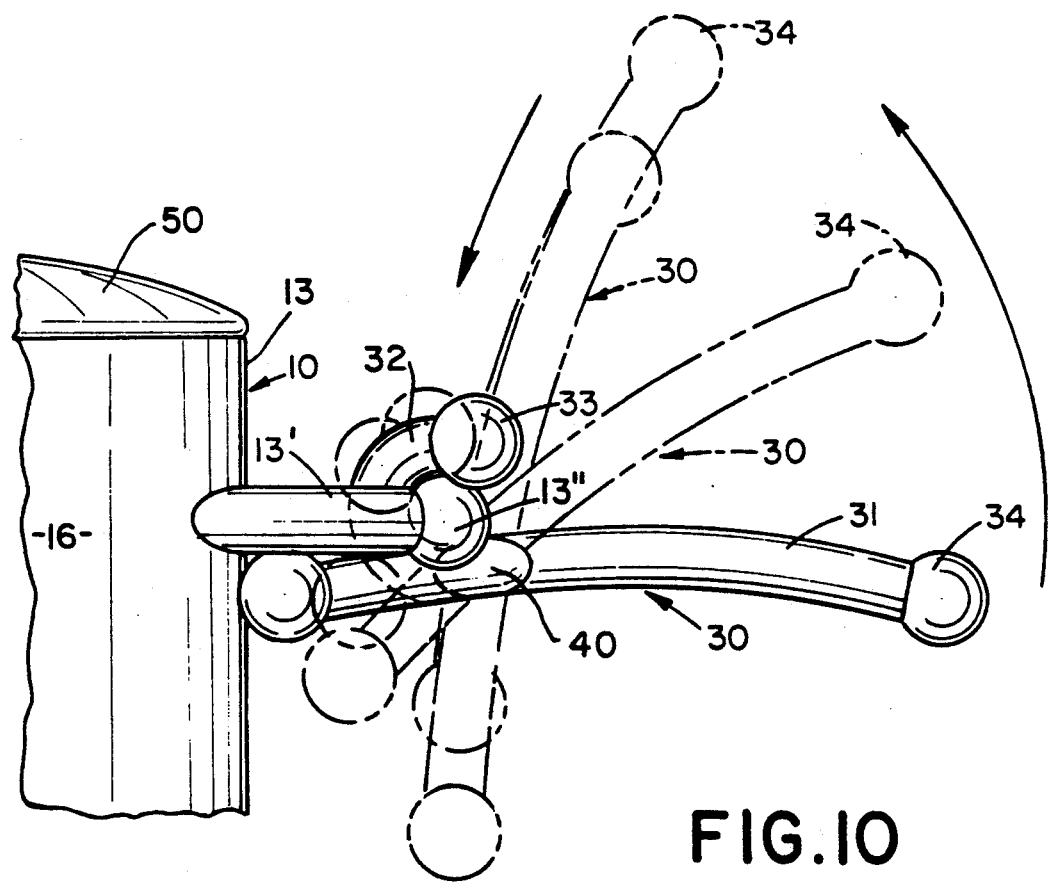
FIG. 10 is a partial side view illustrating various positions of the pot and various operative positions of the extended handle.

FIG. 6 shows how the handle is placed on the pot. First the J-shaped elongated members 31, 33 of the detachable handle is placed through the opening space 25 formed between the pot and the pairs of stems 11' and 13' on the permanent handles. The detachable handle 30 is lowered into place as shown in FIG. 9. The ends of two short rod members 40 forming the top of a Y-shaped detachable member engage the sides of the pot as shown in FIGS. 8-10 inclusive and form a secured connection between the handles of the pot and the detachable handle.

The pot as shown is provided with a cover 50 and pots so constructed may be stacked and stored in minimum storage space. Slanting of the front and rear sides of the pot as shown and described however creates innumerable advantages for the pot of this invention. The same enables one opening and looking in the pot to view the whole circumference of the pot without the fear of being burned by the steam coming off the pot. It also enables an individual to stir the pot without the fear of being burned by the steam coming off the cooking substance in the pot. It also enables one to pour liquids from the pot much easier due to the inclination of the sides.

While I have described my invention in connection with preferred embodiments, I am aware however that numerous and extensive departures may be made therein without however departing from the spirit of my invention and the scope of the appended claims.

What is claimed:

1. A pot comprising a flat bottom portion, parallel rear and front sides extending upwardly from the bottom portion, said rear and front sides being disposed rearwardly in the same direction at an inclined angle to the bottom portion, lateral sides connecting the rear and front sides disposed at an angle of approximately 90 degrees to the bottom portion.

2. A pot as in claim 1 wherein the angle at which the rear and front sides slant is approximately 70 degrees.

3. A pot as claimed in claim 1 having a relatively short handle extending outwardly from each of the lateral sides of the pot, each of said handles having a pair of outwardly extending relatively short spaced stems provided with ball shaped ends, the stems of each pair angled toward each other with space between the stems, an elongated separate handle provided with a curved hook end adapted to be hooked into the space between the stems to provide an extension for either of the short handles secured to the pot.

* * * * *

UNITED STATES PATENT AND TRADEMARK OFFICE
CERTIFICATE OF CORRECTION

PATENT NO. : 5,086,939
DATED : February 11, 1992
INVENTOR(S) : Keith Foulkes, Jr.

It is certified that error appears in the above-identified patent and that said Letters Patent is hereby corrected as shown below:

Title page, in the Abstract, line 7, change "pair" to --pairs--.

Col. 1, line 45, change "V" to --v--.

Col. 1, line 66, change "1" to --3--.

Col. 1, line 67, change "bottom" to --top--.

Col. 2, line 50, change "C" to --c--.

Signed and Sealed this

Twenty-ninth Day of June, 1993

Attest:

MICHAEL K. KIRK

*Attesting Officer*     *Acting Commissioner of Patents and Trademarks*